US006130303A

United States Patent [19]
Neff et al.

[11] Patent Number: 6,130,303
[45] Date of Patent: Oct. 10, 2000

[54] WATER-SOLUBLE, HIGHLY BRANCHED POLYMERIC MICROPARTICLES

[75] Inventors: Roger Edgar Neff, Stamford; Roderick Glyn Ryles, Milford, both of Conn.

[73] Assignee: Cytec Technology Corp., Wilmington, Del.

[21] Appl. No.: 08/180,933

[22] Filed: Jan. 11, 1994

Related U.S. Application Data

[63] Continuation of application No. 07/643,309, Jan. 22, 1991, abandoned, which is a continuation of application No. 07/285,931, Dec. 19, 1988, abandoned.

[51] Int. Cl.[7] .......... C08F 220/56

[52] U.S. Cl. .......... 526/306; 526/240; 526/287; 526/291; 526/292.2; 526/292.95; 526/307; 526/307.2; 526/307.3; 526/307.4; 526/307.6; 428/402

[58] Field of Search .......... 526/264, 287, 526/291, 292.2, 292.95, 303.1, 307, 307.2, 307.3, 307.4, 307.6, 240, 306; 428/402

[56] References Cited

U.S. PATENT DOCUMENTS

| | | | |
|---|---|---|---|
| 2,937,143 | 5/1960 | Goren et al. | 210/52 |
| 3,235,490 | 2/1966 | Goren et al. | 210/52 |
| 3,968,037 | 7/1976 | Morgan et al. | 210/47 |
| 4,172,066 | 10/1979 | Zweigle et al. | 525/329.4 |
| 4,521,317 | 6/1985 | Candan et al. | 252/8.55 D |
| 4,720,346 | 1/1988 | Flesher et al. | 210/734 |
| 4,943,378 | 7/1990 | Flesher et al. | 210/734 |
| 4,956,399 | 9/1990 | Kozakiewicz et al. | 523/223 |
| 4,956,400 | 9/1990 | Kozakiewicz et al. | 523/223 |
| 5,070,133 | 12/1991 | Miyajima | 524/501 |

OTHER PUBLICATIONS

"Inverse Microemulsion Polymerization," Leong et al., *The Journal of Physical Chemistry*, vol. 86, No. 13, 1982, pp. 2269–2271.

"Detection of Microgels in Polyacrylamide Solutions Using Microcapillary Flow Analysis," Sugarman et al., J. of Applied Polymer Science, vol. 33, 693–702 (1987).

J.E. Morgan, M.A. Yorke, and J.E. Boothe "How Cationic Polymer Structure Dewatering Efficiency of Activated Sludges," *ACS*, pp. 235–252, (1980).

*Primary Examiner*—Fred Teskin
*Attorney, Agent, or Firm*—Frank M. Van Riet

[57] ABSTRACT

Water-soluble, high molecular weight, polymeric, microparticles with a high degree of branching are disclosed. A microemulsion polymerization process for preparing the microparticles is also disclosed. The microparticles give excellent results in a number of solid-liquid separation processes.

6 Claims, No Drawings

WATER-SOLUBLE, HIGHLY BRANCHED POLYMERIC MICROPARTICLES

This is a continuation of application Ser. No. 07/643,309, filed on Jan. 22, 1991, which, in turn is a continuation of application Ser. No. 07/285,931 filed Dec. 19, 1988, both abandoned.

The present invention relates to water-soluble, high molecular weight, highly branched, polymeric microparticles and a process for preparing same. The microparticles are useful in a number of solid-liquid separation processes.

BACKGROUND OF THE INVENTION

Highly branched polymeric compositions are known to those skilled in the art and are useful in a variety of solid-liquid separation applications, particularly in flocculation of various dispersions of suspended solids, such as sewage sludge, and in the thickening of cellulosic paper suspension. Modern concerns about environmental pollution and the increasing cost of materials have made it highly desirable to produce flocculating agents which improve the dewatering efficiency of suspended wastes.

It has not been found that highly branched, water-soluble, high molecular weight polymeric microparticles, wherein said microparticles have an average unswollen diameter of less than about 0.1 micron, a solution viscosity of at least about 1.8 mPa.s, as defined below, and having a branching agent content of at least about 4 molar parts per million, based on the monomeric units percent in the polymer, satisfy these demands, cationic microparticles having a solubility quotient of greater than about 30 percent.

The prior art discloses several attempts to produce high molecular weight, branched, water-soluble polymers. Zweigle, U.S. Pat. No. 4,059,522 discloses the use of branching agents to yield a totally crosslinked system, but flocculants prepared in this manner are insoluble in water and thus ineffective. Morgan, et al., U.S. Pat. No. 3,698,037 discloses branched, cationic homopolymers obtained through incorporation of a multifunctional branching agent in the absence of a molecular weight controlling or chain-transfer agent. Said inventors allege that while insoluble products are formed by gel or suspension polymerization techniques, soluble products are obtained through emulsion polymerization despite the use of higher concentrations of crosslinking agents. However, said inventors failed to set forth any data showing the emulsion polymers to be truly soluble. It is a well known fact to those skilled in the art, that it is very difficult to discern the true solubility characteristics of oil-in-water emulsion polymers since the dispersed oil gives rise to an opaque dispersion which masks the visual appearance of insoluble material which may be present. Solubility characteristics are further masked since emulsion polymerization produces polymer particles in the range of form 1 to 10 microns in diameter which particles are too small to be detected by the unassisted eye. It is also well known to those skilled in the art, that the molecular weight of such cationic homopolymers is limited, whereas much higher molecular weights may be obtained by copolymerizing with non-ionic monomers. Furthermore, conventional inverse emulsion polymerization rather consistently produces particles with average diameter ranging from about 1 to about 10 microns.

Pech, Fr. 2,589,145 discloses a branched copolymer prepared using solution polymerization techniques in the presence of a high activity transfer agent. However, the polymers disclosed therein comprise molecules having molecular weights below 1 million with solution viscosities in the range of from 2200 to 3600 mPa.s at 20 percent polymer concentrations, thus showing these polymers to be truly low molecular weight polymers. Furthermore, polymeric microparticles having an average diameter of less than 0.1 micron cannot be prepared through the Pech solution polymerization teaching, even in the presence of a chain-transfer agent.

Other patent disclosures, Whittaker, U.S. Pat. No. 4,705,640; Flesher, et al., U.S. Pat. No. 4,720,346; and Farrar, U.S. Pat. No. 4,759,856; teach shearing of the crosslinked polymer chains to obtain desired water-solubility. However, shearing requires expensive mechanical equipment and is inconvenient for the end-user. Furthermore, shearing is ineffective to produce the microparticles of this invention having an average diameter of less than 0.1 micron.

Water-insoluble, highly crosslinked, acrylamide latices or microgels are disclosed in Leong, et al., *Inverse Microemulsion Polymerization*, J. of Phys. Chem., Vol. 86, No. 13, Jun. 24, 1982, pp. 2271–3, wherein the author uses a 100:1 mixture of arylamide:methylenebisacrylamide. No use of cationic or anionic monomers is mentioned.

Unexpectedly, water-soluble, highly branched, high molecular weight, cationic, non-ionic and anionic, polymeric microparticles are prepared by the practice of the processes of the present invention. These microparticles, when dissolved in water, surprisingly are excellent flocculating agents, producing highly efficient dewatering and thus satisfy a long felt need in the art.

SUMMARY OF THE INVENTION

According to the present invention, there are provided highly branched, water-soluble, high molecular weight, cationic, non-ionic or anionic polymeric microparticles having a branching agent content of above about 4 molar parts per million, based on the monomeric units present in the polymer, wherein said microparticles have an average unswollen diameter of less than about 0.1 microns, and a solution viscosity of at least about 1.8 mPa s, the cationic particles having a solubility quotient of at least about 30.

Preferred are cationic microparticles comprising acrylamide copolymerized with an ethylenically unsaturated cationic monomer such as those selected from N,N-dialkylaminoalkylacrylates and methacrylates and their quaternary or acid salts; N,N-dialkylaminoalkylacrylamides and methacrylamides and their quaternary or acid salts; and N,N-diallyldimethylammonium salts or mixtures of any of the foregoing. Others may also be used.

Alternatively, acrylamide may be copolymerized with an ethylenically unsaturated anionic monomer, such as (meth) acrylic acids; sulfoalkyl(meth)acrylic acids; sulfonated styrenes; unsaturated dicarboxylic acids; sulfoalkyl(meth) acrylamides and salts of said acids.

Preferred non-ionic monomers are selected from acrylamide; methacrylamides; N-alkylacrylamides such as N-methlacrylamide and N-methylmethacrylamide; N,N-dialkylacrylamides such as N,N-dimethylacrylamide; N-vinyl methacetamide; N-vinylmethylformamide, N-vinyl pyridine, N-vinyl pyrrolidione and mixtures of any of the foregoing.

The present invention also provides processes for the preparation of highly branched, water-soluble, high molecular weight, polymeric microparticles as defined above, said process comprising:

(a) admixing
  (i) an aqueous solution comprising at least one ethylenically unsaturated cationic non-ionic or anionic monomer and at least 4 molar parts per million based on the initial monomer content of at least one branching agent;

(ii) an oil comprising at least one hydrocarbon liquid; and (iii) an effective amount of surfactant or surfactant mixture, so as to form an inverse emulsion which when subjected to polymerization conditions, results in a polymer having a particle size of less than 0.1 micron in unswollen diameter; and (b) subjecting the inverse emulsion obtained in step (a) to copolymerization conditions.

DETAILED DESCRIPTION OF THE INVENTION

The present invention discloses an emulsion composition containing water-soluble high, molecular weight, branched cationic, anionic and non-ionic polymers and processes for preparing same. The copending application, "High Performance Polymer Flocculating Agents", Neff et al., Ser. No. 07/285,933, filed concurrently herewith (Attorney's docket number 30,729) now abandoned, has shown that various materials may be prepared by conventional emulsion (particle size generally above 1.0 micron) or gel polymerization techniques by optimum employment of chain-transfer agents. The present disclosure demonstrates that similar branched polymers can be prepared without the addition of chain transfer agents by employing polymerization techniques which result in the formation of polymeric microparticles having an average diameter of less than 0.1 micron.

Cationic monomers useful in the practice of this invention include diallyldimethylammonium chloride; acryloxyethyltrimethylammonium chloride; (meth)acrylates of N,N-dialkylaminoalkyl compounds, quaternaries and salts thereof; N,N-dialkylaminoalkyl(meth)arylamides, salts and quaternaries thereof, such as N,N-dialkylaminoethylacrylamides; (meth) acrylamidopropyltrimethylammonium chloride; and the like. Cationic monomers are generally of the following formulae:

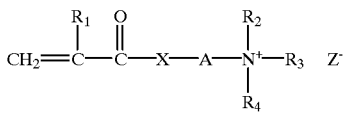

wherein $R_1$ is hydrogen or methyl, $R_2$ is hydrogen or lower alkyl of $C_1$ to $C_4$, $R_3$ and/or $R_4$ are hydrogen, alkyl of $C_1$ to $C_4$, aryl or hydroxyethyl and $R_2$ and $R_3$ or $R_2$ and $R_4$ can combine to form a cyclic ring containing one or more hetero atoms, and Z is the conjugate base of an acid, X is oxygen or —NR1— wherein R1 is as defined above, and A is an alkylene group of C1 to C12; or (II)

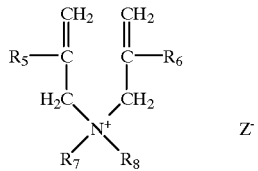

where $R_5$ and $R_6$ are hydrogen or methyl, $R_7$ is hydrogen, alkyl of $C_1$ to $C_{12}$ or benzyl, and $R_8$ is hydrogen, alkyl of $C_1$ to $C_{12}$, benzyl or hydroxyethyl; and Z is as defined above.

Anionic monomers useful in the practice of the present invention are selected from anionic ethylenically unsaturated compounds. Generally, they comprise water-soluble carboxylic or sulfonic acids such as (meth)acrylic acid; styrene sulfonic acid; itaconic acid; 2-acrylamido-2-methylpropanesulfonic acid; sulfoalkyl(meth)acrylic acid; the salts thereof or other water-soluble forms of these of other polymerizable carboxylic or sulfonic acids, or sulfomethylated (meth)acrylamides and the like.

Non-ionic monomers, suitable in the practice of this invention, generally comprise acrylamide; methacrylamide; N-alkylacrylamides such as N-methyl acrylamide; N,N-dialkylacrylamides such as N,N-dimethylacrylamide; methyl acrylate; methyl methacrylate; acrylonitrile; N-vinyl methylacetamide or formamide; vinyl acetate; N-vinyl pyrrolidone and the like.

These ethylenically unsaturated monomers may be polymerized to produce cationic, anionic and non-ionic homopolymers, copolymers, terpolymers and the like. The monomers are combinable in all proportions. Preferably, a non-ionic monomer, such as acrylamide, is copolymerized with a cationic monomer to produce a cationic copolymer. Copolymers useful in the practice of the present invention comprise from about 1 to about 99 parts, by weight, of non-ionic monomer and from about 99 to about 1 part by weight of anionic or cationic monomer or mixtures thereof.

Polymerization of the monomers occurs in the presence of a polyfunctional branching agent to form the branched polymers. The polyfunctional branching agent comprises molecules having either at least two double bonds, a double bond and a reactive group, or two reactive groups. Polyfunctional branchings useful herein should also possess at least some water-solubility. Illustrative of those having at least two double bonds are methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide and the like. Polyfunctional branching agents containing at least one double bond and at least one and at least one reactive group include glycidyl acrylate, acrolein, methylolacrylamide and the like. Polyfunctional branching agents containing at least two reactive groups include dialdehydes, such as glyoxal; diepoxy compounds; epichlorohydrin and the like.

Branching agents should be employed in sufficient quantities to assure a highly branched copolymer product. Preferably, a branching agent content of from about 4 to about 4000 molar parts based on the monomeric units present in the polymer chain is added to induce sufficient branching of the polymer chain.

The solubility of cationic polymers is measured by determining the solubility quotient. For the purposes of this invention, solubility quotient (% CEQ) is defined as the total mole percent cationicity in the polymer as determined by an anion binding technique (CEQ), e.g. colloid titration, divided by the total cationicity as determined by an analytical technique which does not depend on anion binding, e.g. nuclear magnetic resonance, infra-red spectroscopy or chemical analysis, the quotient of which is multiplied by 100. The cationicity is determined by measuring the CEQ as described in Volume 62, Number 7 of the *Journal of Chemical Education*, dated July 1985 at pages 627 to 629, comprises measuring the cationicity of a solution using colloid titration to determine the solubility in water. Only when a cationic polymer exhibits a solubility quotient greater than 30, preferably greater than 40 and even more preferably greater than 50 do the instant polymers exhibit the required solubility characteristics.

Solubility of anionic polymers can be determined by using a corresponding AEQ method.

Essential to the practice of the present invention is that the polymeric microparticles possess an average unswollen i.e. a produced upon polymerization, diameter of less than 0.1 micron. A preferred polymerization technique for producing such microparticles is to polymerize the monomers in an emulsion in the presence of a high concentration of high activity surfactants, such as in a microemulsion.

Polymerization in microemulsions and inverse microemulsions is known to those skilled in this art. P. Speiser reported in 1976 and 1977 a process for making spherical "nanoparticles" with diameters less than 800 Å by (1) solubilizing monomers such as acrylamide and methylenebisacrylamide, and other materials, e.g. drugs, in micelles and (2) polymerizing the monomers, see J. Pharm. Sa., 65(12), 1763 (1976); and U.S. Pat. No. 4,021,364. Both inverse water-in-oil and oil-in-water "nanoparticles" were prepared by this process. While not specifically called a microemulsion polymerization by the author, this process does contain all the features which are currently used to define microemulsion polymerization. These reports also constitute the first examples of polymerization of acrylamide in a microemulsion. Since then, numerous publications reporting polymerization of hydrophobic polymers in the oil phase of microemulsions have appeared. See, for example, U.S. Pat. Nos. 4,521,317; 4,681,912; GB 2161429A and Stoffer and Bone, J. Dispersion Sci. and Tech., 1(1), 37 (1980) and Atik and Thomas, J. Am. Chem. Soc, 103 (14), 4279 (1981).

In general, microemulsion polymerization processes are conducted by (i) preparing a monomer microemulsion by adding an aqueous solution of the monomers to a hydrocarbon liquid containing appropriate surfactant or surfactant mixture to form an inverse monomer microemulsion consisting of small aqueous droplets dispersed in the continuous oil phase and (ii) subjecting the monomer microemulsion to free radical polymerization.

In order to obtain an inverse microemulsion, it is generally necessary to use particular formulations whose main parameters are as follows: surfactant concentration, HLB of surfactant or surfactant mixture, temperature, nature of organic phase and composition of the aqueous phase.

The aqueous phase comprises an aqueous mixture of monomers, as above-defined, and branching agent, as above-defined. The aqueous monomer mixture may also comprise such conventional additives as are desired. For example, the mixture may comprise chelating agents to remove polymerization inhibitors, pH adjusters, initiators and other conventional additives.

Also contemplated by the present invention is the optional introduction of a chain-transfer agent into the aqueous phase for the purpose of controlling the molecular weight to a desired level. Many chain transfer agents are useful in the practice of the present invention and include alcohols such as isopropyl alcohol; mercaptans; thioacids; phosphites and sulfites, although many different chain transfer agents may be employed.

Essential to the formation of the microemulsion; which may be defined as a swollen, transparent and thermodynamically stable emulsion comprising two liquids insoluble in each other and a surfactant, in which the micelles are usually 1000 Å or less in diameter is the selection of appropriate organic phase and surfactant(s).

The selection of the organic phase has a substantial effect on the minimum surfactant concentration necessary to obtain the inverse microemulsion and may consist of a hydrocarbon or hydrocarbon mixture. Saturated hydrocarbons or mixtures thereof are the most suitable in order to obtain inexpensive formulations. Typically, the organic phase will comprise benzene; toluene; fuel oil; kerosene; odorless mineral spirits or mixtures of any of the foregoing.

The ratio, by weight, of the amounts of aqueous and hydrocarbon phases is chosen as high as possible, so as to obtain, after polymerization, a microemulsion of high polymer content. Practically, this ratio may range, for example, from about 0.5 to about 3:1, and is usually about 1:1, respectively.

The one or more surfactants are selected in order to obtain an HLB (Hydrophilic Liophilic Balance) value ranging from about 8 to about 12. Outside this range, formation of inverse microemulsions either cannot be obtained or require an uneconomical amount of surfactant. In addition to the appropriate HLB value, the concentration of surfactant must also be optimized, i.e. sufficient to form the microemulsion. Too low a concentration of surfactant leads to the formation of standard inverse emulsions and too high a concentration results in increased costs and does not impart any significant benefit. Typical surfactants useful in the practice of this invention may be anionic, cationic or non-ionic. Preferred surfactants include sorbitan monooleate; polyoxyethylene (20) sorbitan triolate; polyoxyethylene sorbitol hexaoleate; sorbitan triolate; sodium di-2-ethylhexylsulfosuccinate oleamidopropyldimethylamine; sodium isostearyl-2-lactate and the like.

Optimally, the effective amount of surfactant employed, results in the formation of particles of less than about 0.08 micron in unswollen number average diameter. Average particle diameter is determined by quasi-elastic light scattering, transmission electron microscopy, etc., using an conventional equipment for performing such a measurement.

Polymerization of the microemulsion may be carried out in any manner known to those skilled in the art. Initiation may be effected with a variety of thermal and redox free radical initiators, including azo compounds such as azobisisobutyronitrile; or inorganic compounds such as, potassium persulfate; peroxides such as t-butyl peroxide and redox couples such as ferric ammonium sulfate/ammonium persulfate. Polymerization may also be effected by photochemical irradiation processes, such as ultraviolet irradiation or by ionizing radiation, performed with a $^{60}$Co source.

On the completion of polymerization, the liquid of the hydrophobic phase can be removed by distillation under vacuum if its presence should be prejudicial to subsequent processing. The use of a hydrophobic phase, e.g. n-hexane, gives rise to a water azeotrope which permits very gentle distillation at room temperature, or depending on the vacuum, even at as low a temperature as 0° C. The polymer particles are precipitated with water-miscible organic solvents, e.g. methanol, followed by ultrafiltration or filtration through diaphragm filters and, where requisite, by vacuum drying of the filter residue. As an alternative, the product can also be separated by centrifuging. Where the presence of the hydrophobic phase is not prejudicial, preparation of an aqueous product from the emulsion may be effected by stripping or by inversion by adding it to an excess of water, optionally containing a breaker surfactant.

The products of this invention are useful in facilitating a wide range of solid-liquid separation operations. The products of this invention may be used as aqueous solutions to dewater sewage and other municipal or industrial sludges, drainage of cellulosic suspensions such as those found in paper production and settling and dewatering of various inorganic suspensions.

DESCRIPTION OF THE PREFERRED EMBODIMENTS

The following examples illustrate the present invention. They are not to be construed to limit the claims in any manner whatsoever.

EXAMPLES 1–6

Microemulsion Polymerization Procedure

An aqueous phase containing 21.33 gms of acrylamide, 51.7 gms of 75 percent acryloxyethyltrimethylammonium chloride, 0.07 gm of 10 percent diethylenetriamine pentaacetate (pentasodium salt), 0.07 gm of 1 percent t-butyl hydroperoxide dissolved in 65.7 gms of deionized water is prepared. The pH is adjusted to 3.5 (±0.1). An oil phase comprising 8.4 gms of (sorbitan sesquioleate, and 51.6 gms (polyoxyethylene hexaoleate, ICI Americas Inc.) dissolved in 170.0 gms of low odor paraffin oil is prepared. The aqueous and oil phases are mixed together in an airtight polymerization reactor fitted with a nitrogen sparge tube, thermometer and activator addition tube. The resultant clear microemulsion is sparged with nitrogen for 30 minutes and the temperature is adjusted to 27.5° C. Gaseous sulfur dioxide is added by bubbling nitrogen through a solution of sodium metabisulfite. The polymerization is allowed to exotherm to its maximum temperature (about 52° C.) and is then cooled to 25° C.

The microemulsion polymerization procedure outlined above is then repeated except varying amounts of a branching agent, methylenebisacrylamide, are incorporated into the aqueous phase.

Emulsion Polymerization Procedure

An aqueous phase is made by dissolving 87.0 gms of commercial, crystal acrylamide, 210.7 gms of 75 percent acryloxyethyltrimethyl ammonium chloride, 4.1 gms of ammonium sulfate, 4.9 gms of 5 percent ethylene diaminetetraacetic acid (disodium salt), (10 ppm) methylenebisacrylamide and 2.5 gms of t-butyl hydroperoxide into 189.3 gms of deionized water. The pH is adjusted to 3.5 (±0.1) with sulfuric acid.

The oil phase is made by dissolving 12.0 gms of sorbitan monooleate into 173.4 gms of low odor paraffin oil.

The aqueous and oil phases are mixed together and homogenized until the particle size is in the 1.0 micron range.

The emulsion is then transferred to a one-liter, three necked, creased flask equipped with an agitator, nitrogen sparge tube, sodium metabisulfite activator feed line and thermometer. The emulsion is agitated, sparged with nitrogen and the temperature adjusted to 25° C. (±1° C.). After sparging for 30 minutes, 0.8 percent sodium metabisulfite (MBS) activator solution is added at 0.028 ml/min. The polymerization is allowed to exotherm to 40° C. where the temperature is controlled with ice water. When cooling is no longer necessary to maintain the temperature, the 0.8 percent MBS activator solution addition rate is increased to 0.055 ml/min and a heating mantle is employed to maintain the temperature. The total polymerization time takes approximately 4 to 5 hours using 11 ml of MBS activator. The finished emulsion product is then cooled to 25° C.

Determination of Solution Viscosity

The solution viscosity is determined on a 0.1 percent active polymer aqueous solution. 5.84 gms of sodium chloride are added to 100 gms of 0.1 percent solution and stirred slowly for 15 minutes. The viscosity of this solution is determined using a LVT Brookfield viscometer with UL adapter at 60 rpm at 25(±1)° C.

The results along with compositional data are set forth below in Table 1.

TABLE 1

| Example | Process | MBA wppm | MBA mppm | S.V. mPa · s | CEQ % | Particle** Diameter |
|---|---|---|---|---|---|---|
| 1 | ME | 2.5 | 1.95 | 2.8 | 82 | |
| 2 | ME | 5 | 3.9 | 3.2 | 68 | |
| 3 | ME | 10 | 7.8 | 2.6 | 79 | |
| 4 | ME | 25 | 19.5 | 2.6 | 88 | |
| 5 | ME | 50 | 39.0 | 2.0 | 81 | |
| 6 | ME | 100 | 78.0 | 2.1 | 93 | 0.077 |
| 1A* | ME | 0 | 0 | 2.0 | 91 | 0.085 |
| 1* | E | 5 | 3.9 | 1.81 | 18.0 | |
| 2* | E | 10 | 7.8 | 1.71 | 16.0 | |
| 3* | E | 20 | 15.6 | 1.55 | 16.2 | |
| 4* | E | 30 | 23.4 | 1.39 | 11.8 | |
| 5* | E | 50 | 39.0 | 1.41 | 6.5 | |
| 6* | E | 100 | 78.0 | 1.26 | 4.1 | |

*= Control sample
ME = Microemulsion polymerization
E = Conventional emulsion polymerization
**= Particle diameter in microns as measured by quasielastic light scattering
MBA = methylenebisacrylamide
wppm = Weight parts per million
S.V. = Solution viscosity
mppm = Molar parts per million

EXAMPLES 7–12

Polymers prepared in Examples 1 to 6 are tested for free drainage according to the following procedures.

A 0.2 percent polymer solution dosage is diluted to 50 ml with deionized water and mixed with 200 gms of sewage sludge using a tumbling method of mixing. The polymer and sludge are tumbled (end to end) in a 1 quart jar for 1.5 minutes at 45 rpm. The flocculated sludge is then poured onto a piece of belt press filter medium held in a 10.5 cm Buchner funnel. A timer is started at the beginning of pouring of the flocculated sludge into the filter media. The volume of filtrate collected after 10 seconds is recorded and the results are set forth in Table 2, below.

TABLE 2

| Example | Previous Example | MBA wppm | MBA mppm | Free Drainage (ml/10 sec) 5.7** | 8.6** | 10.0** | 11.4** | 14.3** | 17.1** |
|---|---|---|---|---|---|---|---|---|---|
| 7A* | — | 0 | 0 | 86 | 130 | 120 | 114 | — | 90 |
| 7B* | 1A* | 0 | 0 | — | 80 | 90 | 120 | — | 110 |
| 7 | 1 | 2.5 | 1.95 | 82 | 128 | 128 | 118 | 110 | 96 |

TABLE 2-continued

| Example | Previous Example | MBA wppm | mppm | Free Drainage (ml/10 sec) 5.7** | 8.6** | 10.0** | 11.4** | 14.3** | 17.1** |
|---|---|---|---|---|---|---|---|---|---|
| 8 | 2 | 5 | 3.9 | — | — | 152 | 152 | — | — |
| 9 | 3 | 10 | 7.8 | 74 | 108 | 150 | 140 | 130 | 120 |
| 10 | 4 | 25 | 19.5 | 76 | 113 | 138 | 146 | 132 | 114 |
| 11 | 5 | 50 | 39.0 | 62 | 90 | — | 130 | 138 | 132 |
| 12 | 6 | 100 | 78.0 | — | 92 | — | 120 | — | 126 |

*= Control sample
7A* = A commercial high molecular weight (S.V. = 3.1 mPa · s) cationic copolymer of similar monomer type and quantity.
**= Dose in pounds of polymer per ton of dry sludge.

Table 2 clearly demonstrates that improved dewatering results are obtained when a branching agent is incorporated into the polymer chain. The products of this invention are also seen to out-perform a conventional emulsion cationic polymer.

EXAMPLES 13–14

Following the procedures of Example 1 of British Patent No. 2160879A, except that a branching agent is added, copolymers of acrylamide and sodium acrylate are prepared by microemulsion polymerization and the solution viscosity is determined and compared to similar copolymers made using a conventional emulsion polymerization technique. The results are set forth in Table 3, below.

TABLE 3

| Example | 13* | 14* | 13 | 14 |
|---|---|---|---|---|
| Composition | | | | |
| AMD, pph | 70 | 70 | 74.7 | 74.7 |
| AcNa, pph | 30 | 30 | 25.3 | 25.3 |
| MBA, wppm | 25 | 50 | 25 | 100 |
| mppm | 11.6 | 23.1 | 11.6 | 46.3 |
| S.V., mPa · s | 1.95 | 1.64 | 2.50 | 2.24 |

AMD = acrylamide
AcNa = sodium acrylate
pph = weight parts per hundred
ppm = weight parts per million
*= prepared by conventional emulsion polymerization Table 3, above, illustrates that water-soluble, highly branched, anionic, polymeric microparticles can be prepared in accordance with the appended claims said microparticles having an average unswollen diameter of less than 0.1 micron as compared to the larger particle diameter achieved using conventional emulsion polymerization as evidenced by the higher solution viscosity attained.

EXAMPLES 15–17

Following Example 5 of British Pat. No. 2161492A, except that varying amounts of methylenebisacrylamide are added and redox initiation is employed, homopolymers of acrylamide are prepared by microemulsion polymerization and the solution viscosity is determined and compared to similar homopolymers obtained using a convention emulsion polymerization technique. The results are set forth in Table 4, below.

TABLE 4

| Example | 15* | 16* | 17* | 15 | 16 | 17 |
|---|---|---|---|---|---|---|
| MBA, wppm | 7.5 | 10 | 15 | 7.5 | 10 | 15 |
| mppm | 3.5 | 4.6 | 6.9 | 3.5 | 4.6 | 6.9 |
| S.V., mPa · s | 1.85 | 1.55 | 1.29 | 3.05 | 3.12 | 2.72 |

*= Control sample-conventional emulsion polymerization

The table above demonstrates that branched homopolymers of acrylamide can be prepared in accordance with the instant process, said homopolymers having higher solution viscosities than polymers prepared using a conventional emulsion technique.

COMPARATIVE EXAMPLES 18–23

The procedure of Example 1 is repeated except that a high concentration of methylenebisacrylamide branching agent, 10,000 weight parts per million, as per Leong et al, J. Phys. Chem. 86, (13), p 2642 (1982), and varying amounts of chain-transfer agents, are incorporated into the aqueous monomer mixture. The results are set forth in Table 5, below.

TABLE 5

| Comparative Example | 18 | 19 | 20 | 21 | 22 | 23 |
|---|---|---|---|---|---|---|
| Chain Transfer agent | I | I | I | Na | Na | Na |
| wppm | 10,000 | 25,000 | 50,000 | 1,000 | 2,500 | 5,000 |
| S.V., mP s | 1.11 | 1.10 | 1.11 | 1.17 | 1.09 | 1.08 |

I = isopropyl alcohol
Na = sodium hypophosphite

Table 5, above, shows that water-soluble branched copolymers (S.V.=1.8 mPa.s or greater) cannot be prepared at this high level, 10,000 wppm, of methylenebisacrylamide even when extremely high concentrations of chain transfer agent are employed. The branching agent concentration is equivalent to that which has been reported by Leong et al.

EXAMPLES 24–29

The procedure of Example 1 is repeated using various cationic comonomers instead of acryloxyethyltrimethylammonium chloride; 24) 3-methacrylamidopropyltrimethylammonium chloride; 25) diallyl dimethylammonium chloride; 26) 1-trimethylammonium-2-hydroxypropylacrylate methosulfate; 27) Trimethylammoniumethylmethacrylate methosulfate; 28) 1-trimethylammonium-2-hydroxypropylmethacrylate methosulfate; 29) Methacryloxyethyltrimethylammonium chloride. Highly branched, water-soluble, high molecular weight, cationic, copolymeric microparticles of less than 0.1 micron diameter and a high solution viscosity are formed in accordance with this invention.

EXAMPLES 30–34

The procedure of Example 13 is repeated using various anionic comonomers instead of sodium acrylate; 30) Acrylic acid, 31) The sodium salt of methacrylate acid, 32) The sodium salt of itaconic acid, 33) The sodium salt of maleic acid and 34) The ammonium salt of 2-acrylamido-2-methylpropanesulfonic acid are employed as anionic monomers. Highly branched, water-soluble, high molecular weight, anionic copolymeric microparticles of high solution viscosity are formed in accordance with this invention.

EXAMPLES 35–39

The procedure of Example 15 is followed using various non-ionic monomers; 35) Methyacrylamide, 36) N-methylacrylamide, 37) N-methylmethacrylamide, 38) N,N-dimethylacrylamide, and 39) N-vinyl pyrrolidone are employed as non-ionic comonomers in place of acrylamide. Highly branched, water-soluble, high molecular weight, non-ionic homopolymeric microparticles of high solution viscosity are formed in accordance with this invention.

EXAMPLES 40–42

The procedure of Example 1 is again followed except that acrylamide is omitted and the cationic monomer thereof is replaced by 40) Methacryloxyethyltrimethylammonium chloride; 41) Diallyldimethylammonium chloride; 42) 3-methacrylamidopropyltrimethylammonium chloride. In each instance, water-soluble, high molecular weight, cationic, highly branched, homopolymeric microparticles are recovered having a high solution viscosity.

EXAMPLES 43–51

The procedure of Example 1 is following using different ranching agents instead of methylenebisacrylamide; 43) Methylenebismethyacrylamide, 44) Polyethyleneglycol dimethylacrylate, 45) Polyethyleneglycol diacrylate, 46) Glycidyl acrylate, 47) Glyoxal, 48) N-vinyl acrylamide, 49) Epichlorohydrin, 50) Divinylbenzene, and 51) Acrolein are employed as branching agents. Highly branched, water-soluble, high molecular weight, cationic, copolymeric microparticles are formed in accordance with this invention.

EXAMPLES 52–55

The procedure of Example 1 is followed except a chain-transfer agent is added to the aqueous solution; 52) Isopropanol, 53) Sodium hypophosphite, 54) Mercaptoethanol, and 55) Thioacetic and are employed as chain-transfer agents. Highly branched, water-soluble, high molecular weight, cationic, copolymeric microparticles are formed in accordance with this invention.

EXAMPLES 56 & 57

The procedure of Example 13 is followed except that arylamide is omitted and 56) ammonium acrylate and 57) 2-acrylamido-2-methylpropanesulfonic acid sodium salt are used in replacement of the sodium acrylate. Anionic homopolymers which are water-soluble, of high molecular weight and highly branched and consist of microparticles thereof are recovered.

The above mentioned patents, patent applications and publications are incorporated herein by reference.

Many variations of the present invention will suggest themselves to those skilled in this art in light of the above detailed description. It is further contemplated that (meth) acrylamide and may be copolymerized with a number of cationic, anionic or non-ionic monomer in all proportions. Terpolymers and the like are also contemplated by the present invention. All methods of polymerization and dewatering are considered within the contemplation of the present disclosure.

All such obvious modifications are within the full intended scope of the appended claims.

What is claimed is:

1. Highly branched, water-soluble, high molecular weight cationic or anionic polymeric microparticles wherein said microparticles have an average unswollen diameter of less than about 0.1 micron, a solution viscosity of at least about 2.0 mPa.s and having a methylenebisacrylamide content of from 2 to 80 molar parts per million based on the monomeric units present in the polymer, said microparticles having a solubility quotient greater than about 30 percent, said polymer being comprised of an acrylamide and a comonomer selected from the group consisting of diallyldimethylammonium chloride; acryloxyethyl trimethylammonium chloride; quaternaries of N,N-dialkylaminoalkyl (meth)acrylamides; (meth)acrylamidopropyltrimethylammonium chloride; (meth)acrylic acid, styrene sulfonic acid; itaconic acid; 2-acrylamido-2-methylpropanesulfonic acid; sulfoalkyl (meth)acrylic acid; salts of the above acids and sulfomethylated (meth)acrylamides.

2. Polymeric microparticles as defined in claim 1 wherein said solution viscosity is at least about 2.2 mPa.s.

3. Polymeric microparticles as defined in claim 1 wherein said solution viscosity is at least about 2.4 mPa.s.

4. Polymeric microparticles as defined in claim 1 wherein said comonomer consists of acryloxyethyltrimethylammonium chloride.

5. Polymeric microparticles as defined in claim 1 wherein said comonomer consists of salt of acrylic acid.

6. Cationic polymeric microparticle as defined in claim 1 wherein said solubility quotient is greater than about 40 percent.

* * * * *